US012049999B1

(12) United States Patent
Xu et al.

(10) Patent No.: US 12,049,999 B1
(45) Date of Patent: Jul. 30, 2024

(54) LED LAMP

(71) Applicant: SHENZHEN SNC OPTO ELECTRONIC CO., LTD., Guangdong (CN)

(72) Inventors: Jianyong Xu, Guangdong (CN); Zhigang He, Guangdong (CN)

(73) Assignee: SHENZHEN SNC OPTO ELECTRONIC CO., LTD., Shenzhen (CN)

( * ) Notice: Subject to any disclaimer, the term of this patent is extended or adjusted under 35 U.S.C. 154(b) by 0 days.

(21) Appl. No.: 18/433,533

(22) Filed: Feb. 6, 2024

(30) Foreign Application Priority Data

Nov. 20, 2023 (CN) ......................... 202323118323.4

(51) Int. Cl.
*F21V 19/00* (2006.01)
*F21V 17/00* (2006.01)
*F21V 29/507* (2015.01)
*F21V 31/00* (2006.01)
*F21Y 115/10* (2016.01)

(52) U.S. Cl.
CPC .......... *F21V 19/004* (2013.01); *F21V 17/002* (2013.01); *F21V 29/507* (2015.01); *F21V 31/005* (2013.01); *F21Y 2115/10* (2016.08)

(58) Field of Classification Search
CPC .... F21V 19/004; F21V 17/002; F21V 29/507; F21V 31/005; F21Y 2115/10
See application file for complete search history.

(56) References Cited

U.S. PATENT DOCUMENTS

| | | | | |
|---|---|---|---|---|
| 11,519,573 B1 * | 12/2022 | Ma | ........................ | F21V 31/005 |
| 2012/0026744 A1 * | 2/2012 | Peter | ........................ | F21V 29/89<br>362/370 |
| 2017/0219201 A1 * | 8/2017 | Zhou | ...................... | F21V 31/005 |
| 2020/0326045 A1 * | 10/2020 | Qiao | .......................... | F21V 5/08 |
| 2021/0262625 A1 * | 8/2021 | Peng | ...................... | F21V 23/002 |

* cited by examiner

*Primary Examiner* — Tsion Tumebo

(57) ABSTRACT

An LED lamp includes a heat dissipation lamp holder, an LED lamp panel mounted on a front side of the heat dissipation lamp holder; a light-transmitting panel covering the LED lamp panel. The LED lamp further includes a snap-fit assembly, the snap-fit assembly includes a snap-fit member connected to the heat dissipation lamp holder, a first elastic member, and a button. A second elastic member is provided between the button and the heat dissipation lamp. The snap-fit member abuts against the button. When the snap-fit member is reset, an end of the snap-fit member abuts against the light-transmitting panel, the button is in a pressed state and the snap-fit member presses against the button. When the snap-fit member is in a pulled-out state, the end of the snap-fit member is detached from the light-transmitting plate, the button is bounced and abuts against the snap-fit member.

11 Claims, 6 Drawing Sheets

LED LAMP

CROSS-REFERENCE TO RELATED APPLICATIONS

This application claims priority of Chinese Patent Application No. 202323118323.4, filed on Nov. 20, 2023, entitled "LED LAMP", the entire content of which is incorporated herein in its entirety.

TECHNICAL FIELD

The present disclosure relates to lighting devices, and in particular to an LED lamp.

BACKGROUND

LED lamps have many advantages such as energy saving, environmental protection and long life, and have been widely used in various lighting places. Existing LED lamps are generally covered with a lens panel in an emitting light direction of a LED lamp panel. The lens panel is fixed on a radiator through screws. When the lens panel needs to be replaced according to a using place's requirement, or when the LED lamp panel needs to be repaired, a screwdriver needs to be used to remove the lens plate, which is inconvenient and inefficient.

Accordingly, it is necessary to improve a structure of the LED lamp.

SUMMARY

Accordingly, it is necessary to provide an LED lamp for replacing a light-transmitting panel manually.

An LED lamp includes a heat dissipation lamp holder; an LED lamp panel mounted on a front side of the heat dissipation lamp holder; a light-transmitting panel covering the LED lamp panel; a snap-fit assembly including a first elastic member, a button, and a snap-fit member connected to the heat dissipation lamp holder through the first elastic member and abutting against the button; and a second elastic member provided between the button and the heat dissipation lamp holder. The snap-fit assembly is in a first state, the first elastic member is in an initial state, the snap-fit member is reset, an end of the snap-fit member abuts against the light-transmitting panel to fix the light-transmitting panel on the heat dissipation lamp holder, the button is in a pressed state, and the snap-fit member presses against the button. When the snap-fit assembly is in a second state, the first elastic member is stretched, the snap-fit member is in a pulled-out state, the end of the snap-fit member is detached from the light-transmitting panel, and the button is bounced and abuts against the snap-fit member.

Since the snap-fit assembly is provided, it is sufficient to manually place the snap-fit assembly in the second state when the light-transmitting panel needs to be removed. To be specific, the snap-fit member is manually moved horizontally. When an end of the Snap-fit member is detached from the light-transmitting panel, the button is bounced and abuts against the snap-fit member, so as to prevent the snap-fit member from being reset. In this case, the snap-fit member can be manually removed without tools. Correspondingly, it is sufficient to manually move the snap-fit assembly in the first state when the light-transmitting panel needs to be mounted. To be specific, the light-transmitting panel is placed into a mounting position, and then the button is manually pressed. At this time, the button cancels the blocking effect of the snap-fit member, and the snap-fit member is reset backward under the action of the first elastic member. As such, the end of the snap-fit member will abut against the light-transmitting panel and fix the light-transmitting panel on the heat dissipation lamp holder. This operation is quickly and conveniently without any tools.

In one of the embodiments, the snap-fit member includes a first connecting portion on a rear side of the heat dissipation lamp holder, an abutting portion located on the front side of the heat dissipation lamp holder, and a second connecting portion. The second connecting portion is connected between the first connecting portion and the abutting portion, and the first elastic member is connected to the first connecting portion. The first elastic member is connected to the first connecting portion. The snap-fit member of this structure can be forced uniformly and moves more smoothly when being moved, and the front side of the LED lamp as a light-emitting surface, can be more concise and aesthetic.

In one of the embodiments, the first connecting portion of the snap-fit member is provided with a first limiting hole and second limiting hole that extend through the first connecting portion, the first limiting hole and the second limiting hole have different sizes and are in communication with each other, the button includes a pressing post and a stepped post, a radial width of the pressing post is less than that of the stepped post. When the snap-fit assembly is in the first state, the button is in the pressed state, the pressing post is located in of the first limiting hole, and the first connecting portion of the snap-fit member abuts against the stepped post. When the snap-fit assembly is in the second state, the button is bounced, and the stepped post is located in of the second limiting hole.

Since the first limiting hole and the second limiting hole have different sizes and are in communication with each other, and the button includes the pressing post and the stepped post which have different radical widths, the snap-fit assembly can remain in the first state when the button is pressed, and the snap-fit assembly can remain in the second state when the button is bounced. That is, in the first state, the snap-fit member is reset to abut against the light-transmitting panel, and in the second state, the snap-fit member is pulled out and does not abut against the light-transmitting panel.

In one of the embodiments, the snap-fit assembly further includes a fixing member connected to the heat dissipation lamp holder. The fixing member at least partially covers the first connecting portion of the snap-fit member. As such, a portion of the fixing member overlapping the snap-fit member allows a force direction of the snap-fit member to substantially remain on a same plane when the snap-fit member moves, so that the snap-fit member can move more stably and smoothly when the snap-fit member is moved. The fixing member is provided with a through hole. The pressing post of the button is received in the through hole. A radial width of the through hole is less than that of the stepped post. The stepped post is located between the fixing member and the heat dissipation lamp holder, so as to prevent the button from falling off and to enable the button to move along an axial direction of the button.

In one of the embodiments, the first connecting portion of the Snap-fit member is provided with a sliding groove, the heat dissipation lamp holder is provided with a guiding post received in the sliding groove, so that the snap-fit member can move along the sliding groove.

In one of the embodiments, an edge of the heat dissipation lamp holder is provided with at least two openings through the heat dissipation lamp holder. An outer edge of the light-transmitting panel is adjacent to an edge of the opening. The second connecting portion of the snap-fit member extends through the opening. The light-transmitting panel is provided with opening groove adjacent to the opening. When the snap-fit assembly is in the first state, the abutting portion of the snap-fit member is received in the opening groove and abuts against the light-transmitting panel. When the snap-fit assembly is in the second state, the abutting portion of the snap-fit member is detached from the opening groove. As such, the light-transmitting panel can be prevented from moving along its circumferential direction, so that the light-transmitting panel remains fixed.

In one of the embodiments, the front side of the heat dissipation lamp holder is provided with an annular wall surrounding the LED lamp panel. The annular wall is provided with an annular groove. The LED lamp further includes a waterproof sealing ring received in the annular groove, and an edge of the light-transmitting panel covers the waterproof sealing ring, so as to seal the LED lamp panel to achieve the waterproof effect. When the snap-fit assembly is in the first state, projections of the sealing ring, the opening groove, the abutting portion, the button and the second elastic member at least partially coincide with each other in a direction perpendicular to the abutting portion. As such, the abutting portion indirectly presses the sealing ring through a tension of the second elastic member, and the waterproof effect is better.

In one of the embodiments, the first connecting portion is provided with an operation plate. It is convenient to move the snap-fit member manually by the operation plate.

In one of the embodiments, the translucent panel is a lens panel having a lens structure.

In one of the embodiments, the first elastic member is a tension spring, the second elastic member is a compression spring.

According to the LED lamp, the light-transmitting panel can be manually removed for replacement or maintenance without any tools, and the operation is simple and convenient.

BRIEF DESCRIPTION OF THE DRAWINGS

The drawings are only for illustrative purposes and represent only schematic views rather than actual drawings, which cannot be understood as limitations of the present disclosure. In order to better illustrate the embodiments of the present disclosure, some components in the drawings may be omitted, enlarged or reduced, which does not represent the size of the actual product. For those skilled in the art, some well-known structures in the drawings and the descriptions thereof may be omitted.

REFERENCE SIGNS

1. Heat dissipation lamp holder; 2. LED lamp panel; 3. Light-transmitting panel; 4. Snap-fit member; 5. First elastic member; 6. Button; 7. Second elastic member; 8. First connecting portion; 9. Abutting portion; 10. Second connecting portion; 11. First limiting hole; 12. Second limiting hole; 13. Pressing post; 14. Stepped post; 15. Fixing member; 16. Through hole; 17. Sliding groove; 18. Guiding post; 19. Opening; 20. Opening groove; 21. Annular wall; 22. Annular groove; 23. Sealing ring; 24. Operation plate.

DETAILED DESCRIPTION OF THE EMBODIMENTS

Figure 1:
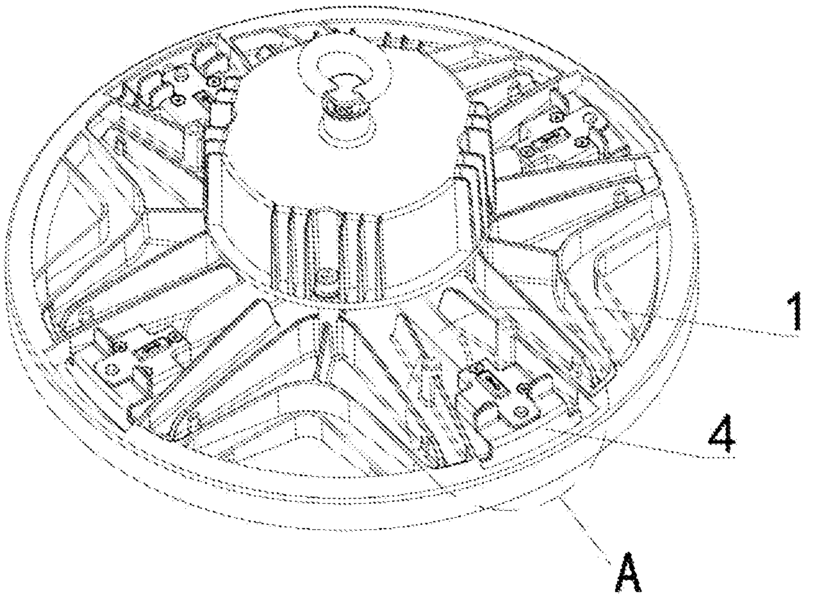
FIG. 1 is a perspective view of an LED lamp according to an embodiment of the present disclosure.
Figure 2:
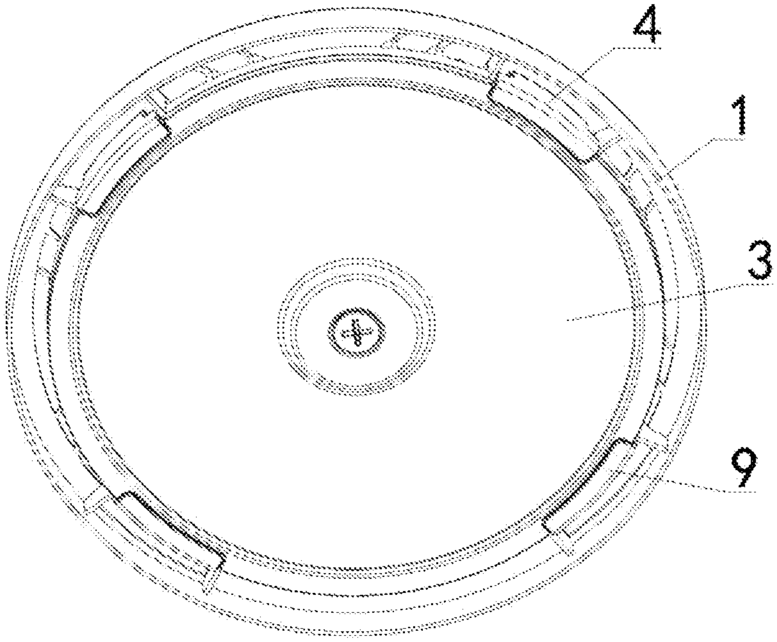
FIG. 2 is another perspective view of the LED lamp of FIG. 1.
Figure 3:
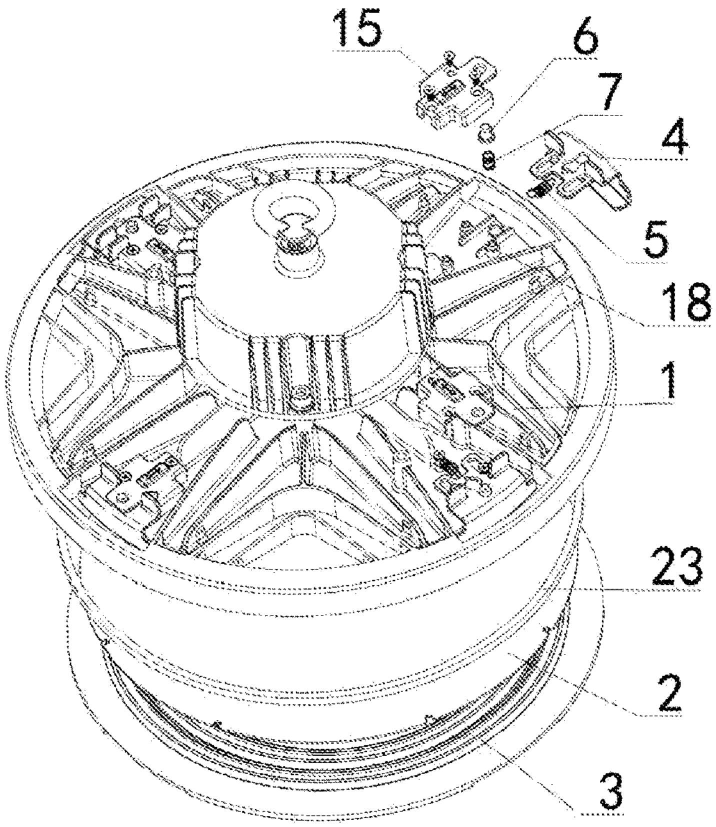
FIG. 3 is an exploded view of the LED lamp of FIG. 1.
Figure 4:
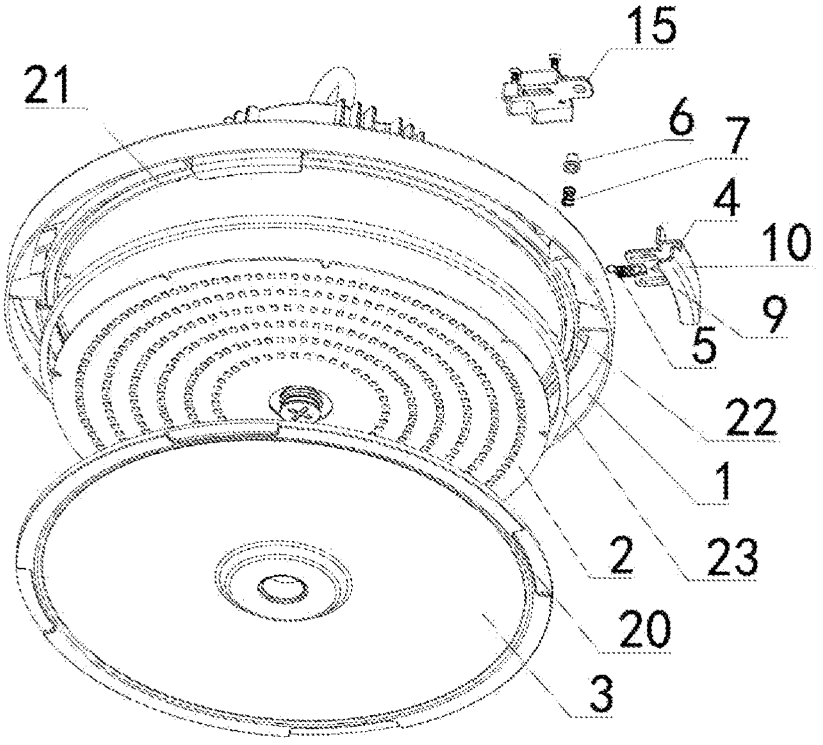
FIG. 4 is similar to FIG. 3, but viewed from another aspect.
Figure 5:
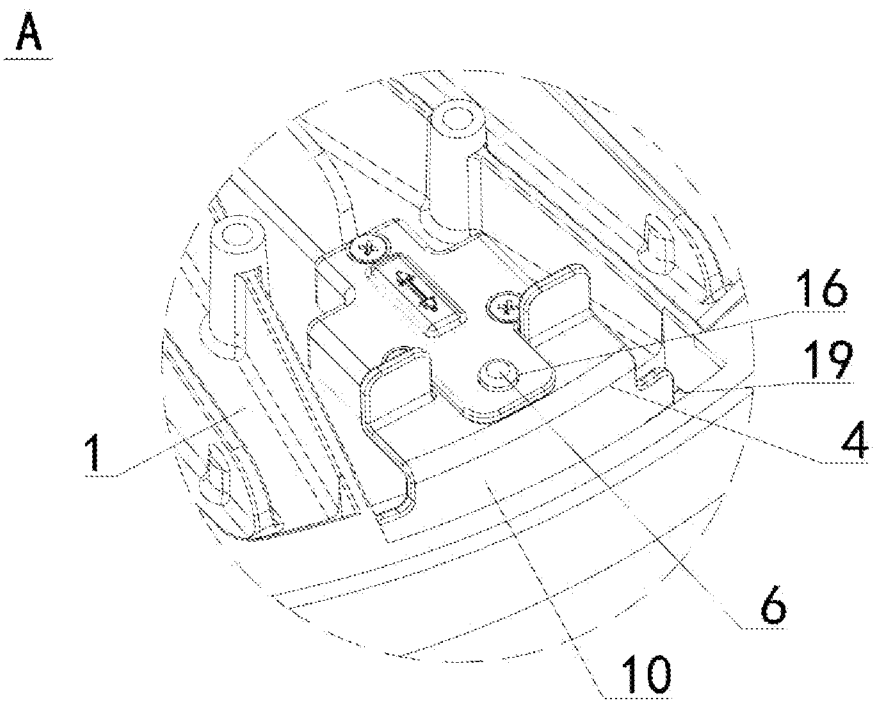
FIG. 5 is an enlarged view of portion A of FIG. 1.
Figure 6:
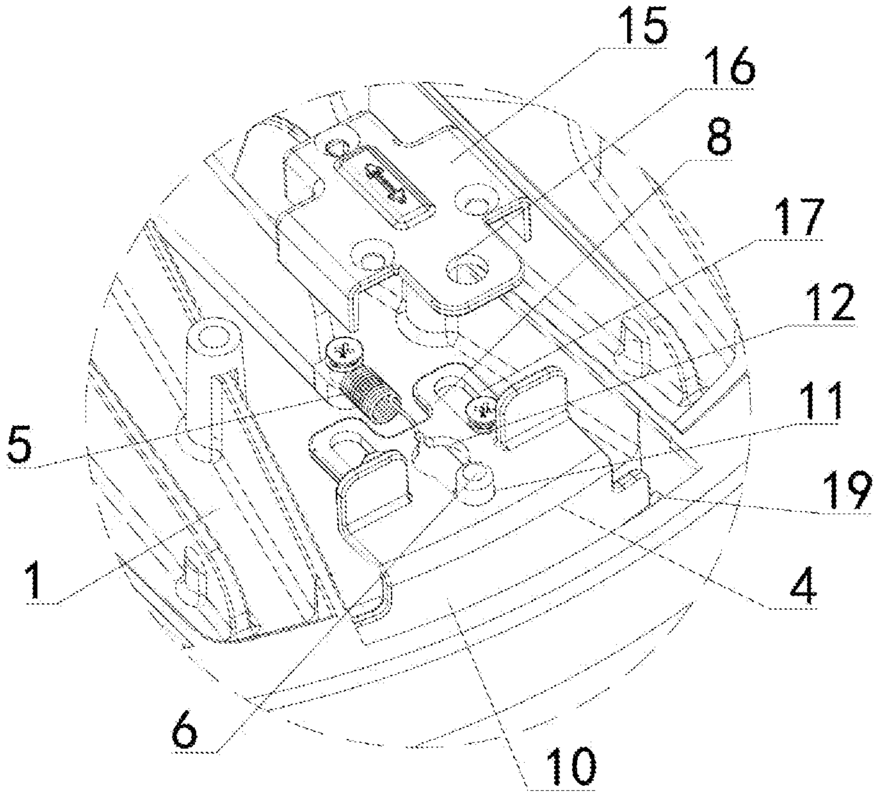
FIG. 6 is a perspective view of a snap-fit member of a snap-fit assembly being reset.
Figure 7:
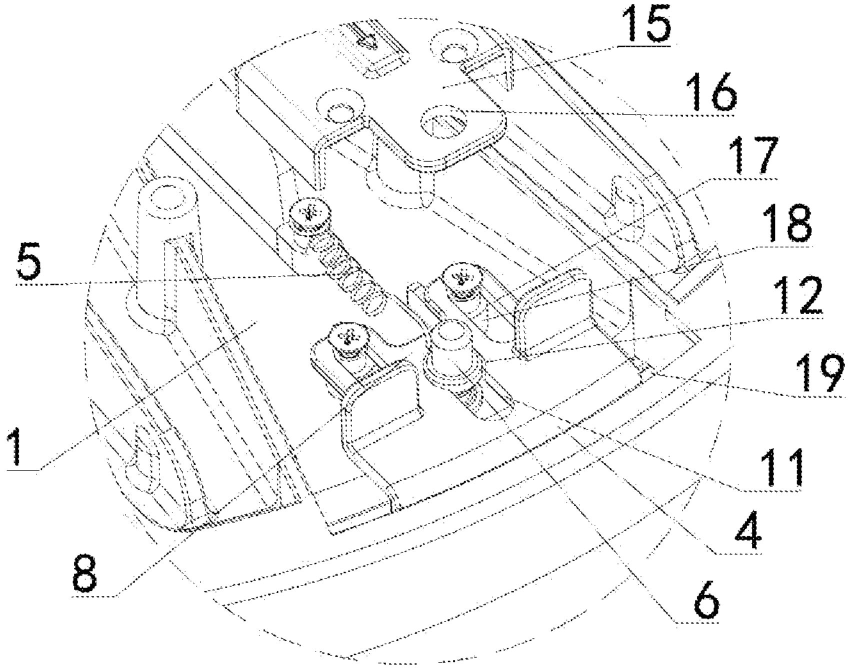
FIG. 7 is a perspective view of a snap-fit member of a snap-fit assembly in a pulled-out state.
Figure 8:
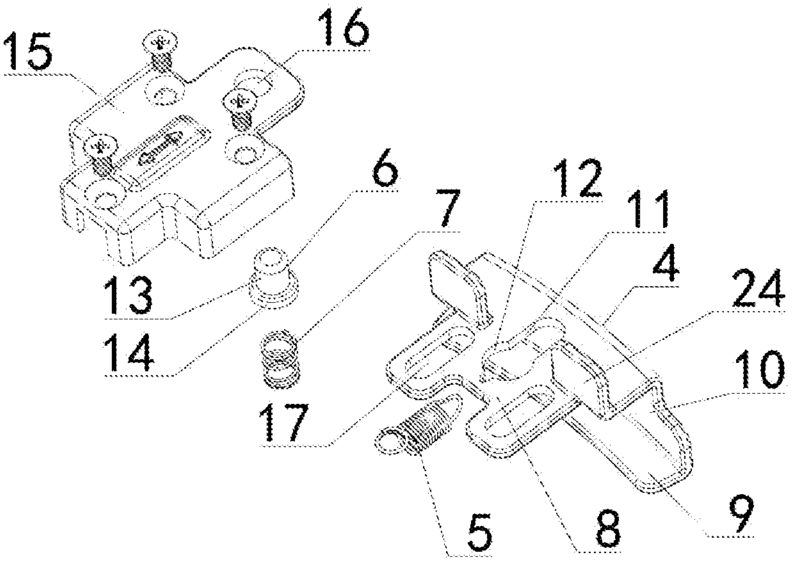
FIG. 8 is a partial exploded view of a snap-fit assembly.
Figure 9:
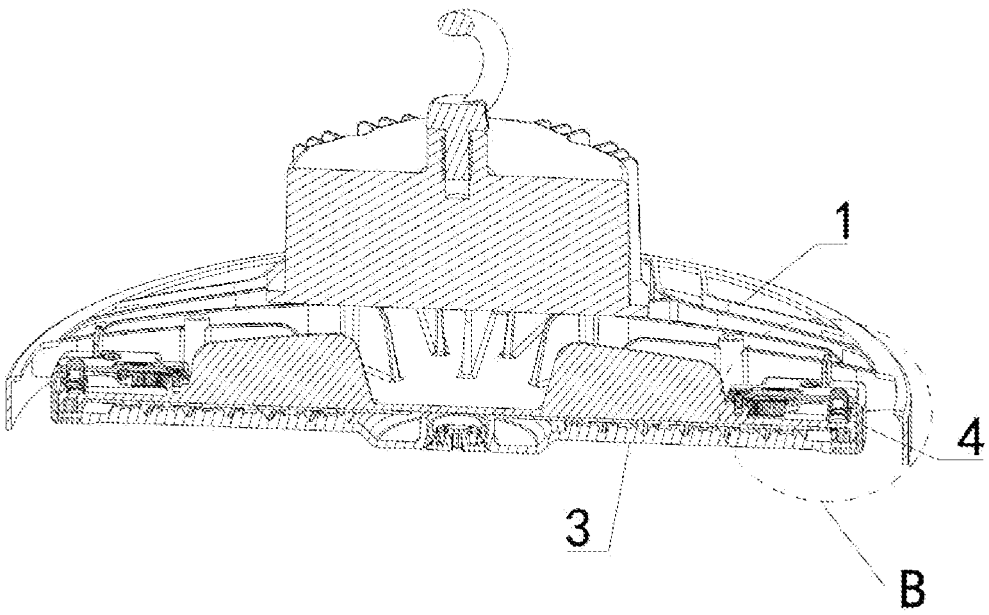
FIG. 9 is a cross-sectional view of the LED lamp, showing the snap-fit member being reset.
Figure 10:
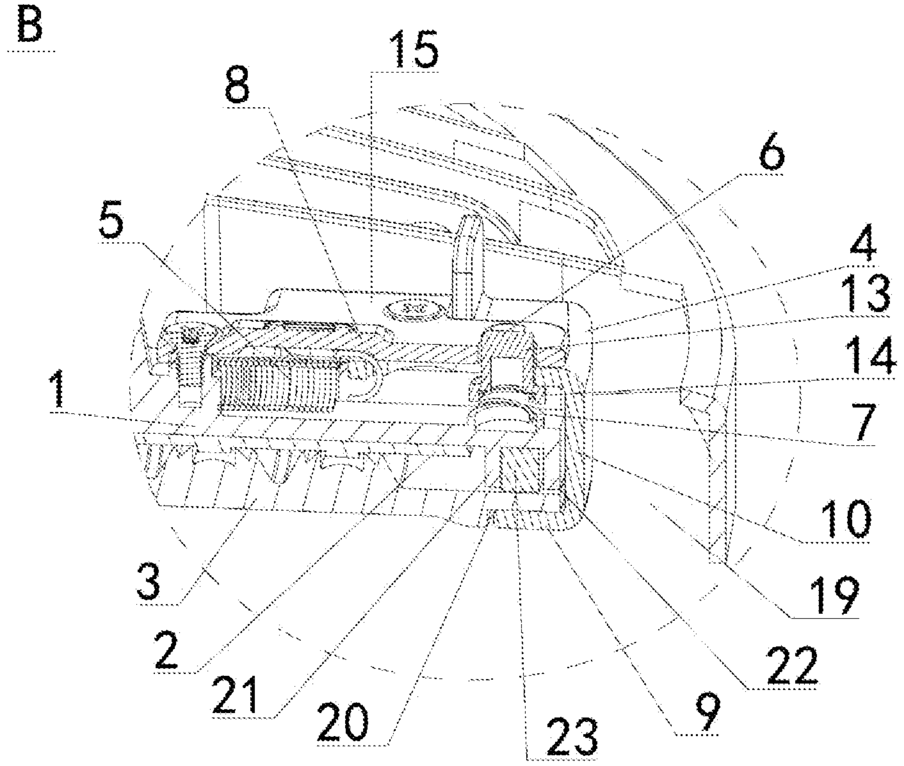
FIG. 10 is an enlarged view of portion B of FIG. 9.
Figure 11:
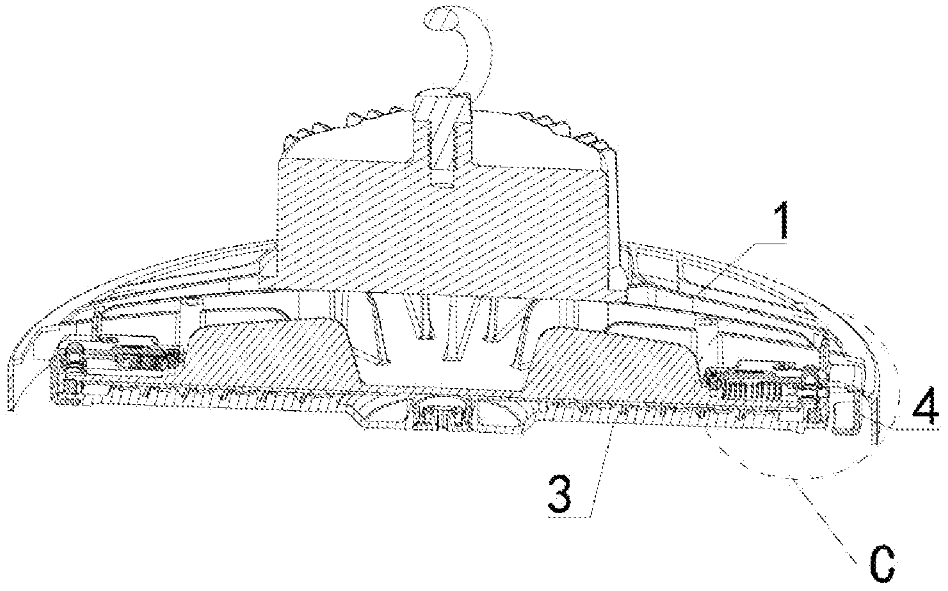
FIG. 11 is cross-sectional view of the LED lamp, showing the snap-fit member in the pulled-out state.
Figure 12:
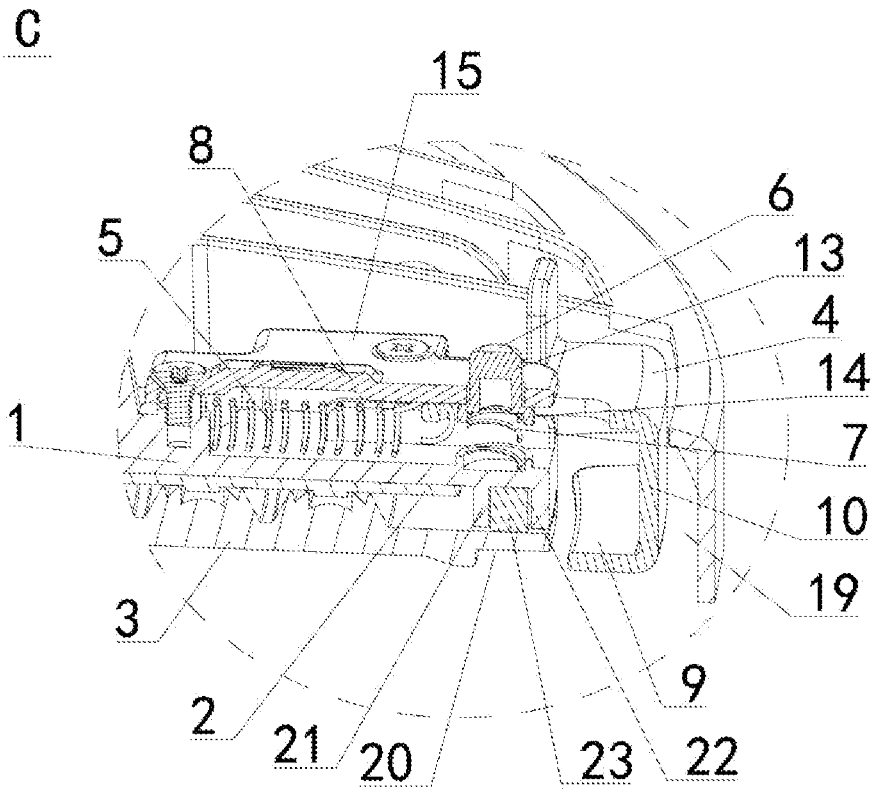
FIG. 12 is an enlarged view of portion C of FIG. 11.

Referring to FIGS. 1 to 12, an LED lamp includes a heat dissipation lamp holder 1, an LED lamp panel 2 mounted on a front side of the heat dissipation lamp holder 1, and a light-transmitting panel 3 covering the LED lamp panel 2. The light-transmitting panel 3 is a lens panel having a lens structure. The LED lamp further includes a snap-fit assembly, which includes a snap-fit member 4, a first elastic member 5, and a button 6. The snap-fit member 4 is connected to the heat dissipation lamp holder 1 through the first elastic member 5. The LED lamp further includes a second elastic member 7 provided between the button 6 and the heat dissipation lamp holder 1. The snap-fit member 4 abuts against the button 6. The first elastic member 5 is a tension spring. The second elastic member 7 is a compression spring.

When the snap-fit assembly is in a first state, the first elastic member 5 is in an initial state, and the snap-fit member 4 is reset. A lower end of the snap-fit member 4 abuts against the light-transmitting panel 3 to fix the light-transmitting panel 3 on the heat dissipation lamp holder 1. The button 6 is in a pressed state, and the snap-fit member 4 presses against the button 6.

When the snap-fit assembly is in a second state, the first elastic member 5 is stretched, the snap-fit member 4 is in a pulled-out state, that is, the snap-fit member 4 is pulled away from a central axis of heat dissipation lamp holder 1. The lower end of the snap-fit member 4 is detached from the light-transmitting panel 3, and the button 6 is bounced and abuts against the snap-fit member 4, so as to prevent the snap-fit member 4 from being reset backward.

Since the snap-fit assembly is provided, it is sufficient to manually place the snap-fit assembly in the second state when the light-transmitting panel 3 needs to be removed. To be specific, the snap-fit member 4 is manually moved horizontally. When an end of the Snap-fit member 4 is detached from the light-transmitting panel 3, the button 6 is bounced and abuts against the snap-fit member 4, so as to prevent the snap-fit member 4 from being reset. In this case, the snap-fit member 4 can be manually removed without tools. Correspondingly, it is sufficient to manually move the snap-fit assembly in the first state when the light-transmitting panel 3 needs to be mounted. To be specific, the light-transmitting panel 3 is placed into a mounting position, and then the button 6 is manually pressed. At this time, the button 6 cancels the blocking effect of the snap-fit member 4, and the snap-fit member 4 is reset backward under the action of the first elastic member 5. As such, the end of the snap-fit member 4 will abut against the light-transmitting panel 3 and fix the light-transmitting panel 3 on the heat dissipation lamp holder 1. This operation is quickly and conveniently without any tools.

The snap-fit member 4 includes a first connecting portion 8 located on a rear side of the heat dissipation lamp holder 1, an abutting portion 9 located on the front side of the heat dissipation lamp holder 1, and a second connecting portion 10. The second connecting portion 10 is connected between the first connecting portion 8 and the abutting portion 9. The first elastic member 5 is connected to the first connecting portion 8. The snap-fit member 4 of this structure can be forced uniformly and moves more smoothly when being moved, and the front side of the LED lamp as a light-emitting surface, can be more concise and aesthetic.

The first connecting portion 8 of the snap-fit member 4 is provided with a first limiting hole 11 and a second limiting hole 12 that extend through the first connecting portion 8. The first limiting hole 11 and the second limiting hole 12 have different sizes and are in communication with each other. The button 6 includes a pressing post 13 and a stepped post 14. A radial width of the pressing post 13 is less than that of the stepped post 14.

When the snap-fit assembly is in the first state, i.e., the initial state, the button 6 is in the pressed state, the pressing post 13 is located in of the first limiting hole 11, and the first connecting portion 8 of the snap-fit member 4 abuts against the stepped post 14.

When the snap-fit assembly is in the second state, i.e., the pulled-out state, the button 6 is bounced, and the stepped post 14 is located in of the second limiting hole 12.

Since the first limiting hole 11 and the second limiting hole 12 have different sizes and are in communication with each other, and the button 6 includes the pressing post 13 and the stepped post 14 which have different radical widths, the snap-fit assembly can remain in the first state when the button 6 is pressed, and the snap-fit assembly can remain in the second state when the button 6 is bounced. That is, in the first state, the snap-fit member 4 is reset to abut against the light-transmitting panel 3, and in the second state, the snap-fit member 4 is pulled out and does not abut against the light-transmitting panel 3.

The snap-fit assembly further includes a fixing member 15 connected to the heat dissipation lamp holder 1. The fixing member 15 may be a sheet metal member. The fixing member 15 at least partially covers the first connecting portion 8 of the snap-fit member 4. As such, a portion of the fixing member 15 overlapping the snap-fit member 4 allows a force direction of the snap-fit member 4 to substantially remain on a same plane when the snap-fit member 4 moves, so that the snap-fit member 4 can move more stably and smoothly when the snap-fit member 4 is moved. The fixing member 15 is provided with a through hole 16. The pressing post 13 of the button 6 is received in the through hole 16. A radial width of the through hole 16 is less than that of the stepped post 14. The stepped post 14 is located between the fixing member 15 and the heat dissipation lamp holder 1, so as to prevent the button 6 from falling off and to enable the button 6 to move along an axial direction of the button 6.

The first connecting portion 8 of the Snap-fit member 4 is provided with a sliding groove17, the heat dissipation lamp holder 1 is provided with a guiding post 18 received in the sliding groove17, so that the snap-fit member 4 can move along the sliding groove17.

An edge of the heat dissipation lamp holder 1 is provided with at least two openings 19 through the heat dissipation lamp holder 1. An outer edge of the light-transmitting panel 3 is adjacent to an edge of the opening 19. The second connecting portion 10 of the snap-fit member 4 extends through the opening 19. The light-transmitting panel 3 is provided with opening groove 20 adjacent to the opening 19. When the snap-fit assembly is in the first state, i.e., the initial state, the abutting portion 9 of the snap-fit member 4 is received in the opening groove 20 and abuts against the light-transmitting panel 3. When the snap-fit assembly is in the second state, i.e., the pulled-out state, the abutting portion 9 of the snap-fit member 4 is detached from the opening groove 20. As such, the light-transmitting panel 3 can be prevented from moving along its circumferential direction, so that the light-transmitting panel 3 remains fixed.

A front side of the heat dissipation lamp holder 1 is provided with an annular wall 21 surrounding the LED lamp panel 2. The annular wall 21 is provided with an annular groove 22. The LED lamp further includes a waterproof sealing ring 23 received in the annular groove 22, and an edge of the light-transmitting panel 3 covers the waterproof sealing ring 23, so as to seal the LED lamp panel 2 to achieve the waterproof effect. When the snap-fit assembly is in the first state, i.e., the initial state, projections of the sealing ring 23, the opening groove 20, the abutting portion 9, the button 6 and the second elastic member 7 at least partially coincide with each other in a direction perpendicular to the abutting portion 9. As such, the abutting portion 9 indirectly presses the sealing ring 23 through a tension of the second elastic member 7, and the waterproof effect is better.

The first connecting portion 8 is provided with an operation plate 24. It is convenient to move the snap-fit member 4 manually by the operation plate 24.

According to the LED lamp, the light-transmitting panel 3 can be manually removed for replacement or maintenance without any tools, and the operation is simple and convenient.

The above-mentioned embodiments do not constitute a limitation on the protection scope of the technical solution. Any modifications, equivalent replacements and improvements made within the spirit and principles of the above-mentioned embodiments shall be included within the protection scope of this technical solution.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall all fall within the protection scope of the present disclosure.

In the drawings of the embodiments of the present disclosure, the same or similar numbers correspond to the same or similar components. In the description of the present disclosure, it should be understood that terms “upper”, “lower”, “front” and “rear”, “left”, “right”, “vertical”, “horizontal”, “lateral”, “longitudinal”, “top”, “bottom”, “inner”, “outer”, and other indicated orientation or positional relationships are based on the orientation or positional relationship shown in the drawings for convenience and simplicity of description of the present disclosure only, and not as an indication or implication that the devices or elements referred to must have or be constructed or operated in a specific orientation. Therefore, the terms describing positional relationships in the drawings are only for illustrative purposes and should not be construed as limitations of the present disclosure.

The above-mentioned embodiments do not constitute a limitation on the protection scope of the technical solution.

Any modifications, equivalent replacements and improvements made within the spirit and principles of the above-mentioned embodiments shall be included within the protection scope of this technical solution.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall all fall within the protection scope of the present disclosure.

What is claimed is:

1. An LED lamp comprising:

a heat dissipation lamp holder;

an LED lamp panel mounted on a front side of the heat dissipation lamp holder;

a light-transmitting panel covering the LED lamp panel;

a snap-fit assembly comprising a first elastic member, a button, and a snap-fit member connected to the heat dissipation lamp holder through the first elastic member and abutting against the button; and a second elastic member provided between the button and the heat dissipation lamp holder;

wherein the snap-fit assembly is in a first state, the first elastic member is in an initial state, the snap-fit member is reset, an end of the snap-fit member abuts against the light-transmitting panel to fix the light-transmitting panel on the heat dissipation lamp holder, the button is in a pressed state, and the snap-fit member presses against the button;

when the snap-fit assembly is in a second state, the first elastic member is stretched, the snap-fit member is in a pulled-out state, the end of the snap-fit member is detached from the light-transmitting panel, and the button is bounced and abuts against the snap-fit member.

2. The LED lamp according to claim 1, wherein the snap-fit member comprises a first connecting portion on a rear side of the heat dissipation lamp holder, an abutting portion located on the front side of the heat dissipation lamp holder, and a second connecting portion; the second connecting portion is connected between the first connecting portion and the abutting portion, and the first elastic member is connected to the first connecting portion.

3. The LED lamp according to claim 2, wherein the first connecting portion of the snap-fit member is provided with a first limiting hole and second limiting hole that extend through the first connecting portion, the first limiting hole and the second limiting hole have different sizes and are in communication with each other, the button comprises a pressing post and a stepped post, a radial width of the pressing post is less than that of the stepped post;

when the snap-fit assembly is in the first state, the button is in the pressed state, the pressing post is located in of the first limiting hole, and the first connecting portion of the snap-fit member abuts against the stepped post;

when the snap-fit assembly is in the second state, the button is bounced, and the stepped post is located in of the second limiting hole.

4. The LED lamp according to claim 3, wherein the snap-fit member further comprises a fixing member connected to the heat dissipation lamp holder, the fixing member at least partially covers the first connecting portion of the snap-fit member; the snap-fit member is provided with a through hole, the pressing post of the button is received in the through hole, a radial width of the through hole is less than that of the stepped post, and the stepped post is located between the fixing member and the heat dissipation lamp holder.

5. The LED lamp according to claim 4, wherein the first connecting portion of the snap-fit member is provided with a sliding groove, the heat dissipation lamp holder is provided with a guiding post received in the sliding groove.

6. The LED lamp according to claim 2, wherein an edge of the heat dissipation lamp holder is provided with at least two openings through the heat dissipation lamp holder, an outer edge of the light-transmitting panel is adjacent to an edge of the opening, the second connecting portion of the snap-fit member extends through the opening, and the light-transmitting panel is provided with an opening groove aligned with the opening;

when the snap-fit assembly is in the first state, the abutting portion of the snap-fit member is received in the opening groove;

when the snap-fit assembly is in the second state, the abutting portion of the snap-fit member is detached from the opening groove.

7. The LED lamp according to claim 6, further comprising a waterproof sealing ring, wherein the front side of the heat dissipation lamp holder is provided with an annular wall surrounding the LED lamp panel, the annular wall is provided with an annular groove, the waterproof sealing ring is received in the annular groove, an edge of the light-transmitting plate covers the waterproof sealing ring, and projections of the sealing ring, the opening groove, the abutting portion, the button and the second elastic member at least partially coincide with each other in a direction perpendicular to the abutting portion when the snap-fit assembly is in the first state.

8. The LED lamp according to claim 6, wherein the first connecting portion is provided with an operation plate.

9. The LED lamp according to claim 6, wherein the light-transmitting panel is a lens panel having a lens structure.

10. The LED lamp according to claim 6, wherein the first elastic member is a tension spring.

11. The LED lamp according to claim 6, the second elastic member is a compression spring.

* * * * *